US012617533B2

(12) United States Patent
Wall et al.

(10) Patent No.: US 12,617,533 B2
(45) Date of Patent: May 5, 2026

(54) TROLLEY RETAINER

(71) Applicant: B/E Aerospace (UK) Limited, Leighton Buzzard (GB)

(72) Inventors: Daniel H. Wall, Baldock (GB); Peter Ashley Griffiths, Kensworth (GB); Samuel Steadman, Coventry (GB)

(73) Assignee: B/E AEROSPACE (UK) LIMITED, Leighton Buzzard (GB)

( * ) Notice: Subject to any disclaimer, the term of this patent is extended or adjusted under 35 U.S.C. 154(b) by 0 days.

(21) Appl. No.: 18/806,243

(22) Filed: Aug. 15, 2024

(65) Prior Publication Data

US 2025/0066020 A1 Feb. 27, 2025

(30) Foreign Application Priority Data

Aug. 22, 2023 (EP) ..................................... 23192914

(51) Int. Cl.
*B64D 11/04* (2006.01)
*B62B 3/14* (2006.01)

(52) U.S. Cl.
CPC ............ *B64D 11/04* (2013.01); *B62B 3/1404* (2013.01); *B62B 2202/67* (2013.01)

(58) Field of Classification Search
CPC ... B64D 11/04; B64D 11/0007; B62B 3/1404; B62B 2202/67
See application file for complete search history.

(56) References Cited

U.S. PATENT DOCUMENTS

| | | | |
|---|---|---|---|
| 7,942,430 B2 | 5/2011 | Van Loon et al. | |
| 9,108,661 B2 | 8/2015 | Suess | |
| 9,695,619 B2 | 7/2017 | Burd | |
| 9,738,387 B2 | 8/2017 | Holtorf et al. | |
| 10,974,901 B1 * | 4/2021 | Vlaming | A47F 1/126 |
| 11,420,748 B2 * | 8/2022 | Tracey | B64D 11/0007 |
| 11,529,987 B2 * | 12/2022 | Dowty | B62B 3/003 |
| 12,128,941 B2 * | 10/2024 | Lange | B62B 3/1404 |
| 2019/0031348 A1 | 1/2019 | Bajorat et al. | |
| 2022/0105975 A1 * | 4/2022 | Dowty | B64D 11/04 |

FOREIGN PATENT DOCUMENTS

EP          3738879          11/2020

OTHER PUBLICATIONS

European Patent Office; European Search Report dated Dec. 14, 2023 in Application No. 23192714.6.
European Patent Office, European Office Action dated Jan. 20, 2026 in Application No. 23192714.6.

* cited by examiner

*Primary Examiner* — Joshua J Michener
*Assistant Examiner* — Cindi M Curry
(74) *Attorney, Agent, or Firm* — SNELL & WILMER L.L.P.

(57) ABSTRACT

A trolley retainer for an aircraft galley, the aircraft galley comprising an aircraft galley structure and a trolley, the trolley retainer comprising: a retainer connector configured to connect the trolley retainer to the aircraft galley structure; a front portion configured to extend across a front of the trolley to retain the trolley in the aircraft galley when the trolley retainer is in a retaining position; and a side portion configured to extend from the retainer connector to the front portion across a side of the trolley when the trolley retainer is in the retaining position.

12 Claims, 2 Drawing Sheets

TROLLEY RETAINER

CROSS-REFERENCE TO RELATED APPLICATIONS

This application claims priority to EP patent application Ser. No. 23/192,714.6, filed Aug. 22, 2023 and titled "TROLLEY RETAINER," which is incorporated by reference herein in its entirety for all purposes.

FIELD

The invention relates to a trolley retainer, an aircraft galley structure and an aircraft.

BACKGROUND

Trolleys are used in aircraft galleys to store items such as food and drink. Trolleys are removed from the aircraft galley to permit access to stored items and to move them around the aircraft, but they are retained in the aircraft galley at other times for safety.

SUMMARY

In a first aspect there is provided a trolley retainer for an aircraft galley, the aircraft galley comprising an aircraft galley structure and a trolley, the trolley retainer comprising: a retainer connector configured to connect the trolley retainer to the aircraft galley structure; a front portion configured to extend across a front of the trolley to retain the trolley in the aircraft galley when the trolley retainer is in a retaining position; and a side portion configured to extend from the retainer connector to the front portion across a side of the trolley when the trolley retainer is in the retaining position.

By having a trolley retainer which includes the described front portion and the side portion, the process for retaining a trolley may be simplified. Additionally, the front portion may permit a retaining load to be spread across the front of the trolley. The retaining position may also be a failure position of the trolley retainer.

In an example, the trolley retainer is movable into an open position to permit removal of the trolley from the aircraft galley.

In an example, the trolley retainer is rotatable at the retainer connector between the retaining position and the open position.

In an example, the trolley retainer comprises: an additional retainer connector configured to connect the trolley retainer to the aircraft galley structure.

In an example, the trolley retainer comprises: an additional front portion configured to extend across a front of the trolley to retain the trolley in the aircraft galley when the trolley retainer is in a retaining position.

In an example, the trolley retainer comprises: an additional side portion configured to extend from the additional retainer connector to the additional front portion, the additional side portion configured to extend across an opposing side of the trolley when the trolley retainer is in the retaining position, wherein the opposing side opposes the side of the trolley.

In an example, the additional front portion connects to the front portion.

In an example, the additional front portion is integrally formed with the front portion.

In an example, the additional front portion does not connect to the front portion.

In an example, the additional front portion and the front portion are configured such that there is lateral displacement between the additional front portion and the front portion in the retaining position.

In an example, the additional front portion and the front portion are configured such that there is vertical displacement between the additional front portion and the front portion in the retaining position.

In an example, the trolley retainer is configured such that in the retaining position the trolley retainer is lower than in the open position.

According to a second aspect, there is provided a galley structure comprising the trolley retainer described above, the galley structure comprising a galley connector, the galley connector configured to connect to the retainer connector.

In an example, the galley connector is on a lower face of the galley structure.

In an example, the galley structure comprises an opening for inserting the trolley into the galley.

In an example, the galley connector is displaced from the opening.

In an example, the galley structure comprises a maintaining device, the maintaining device configured to maintain the retainer in the closed position.

In an example, the maintaining device is on a front of the galley structure.

According to a third aspect, there is provided a galley comprising the galley structure described above.

According to a fourth aspect, there is provided an aircraft comprising the galley structure described above.

The aircraft galley structure of the second aspect, the aircraft galley of the third aspect and/or the aircraft of the fourth aspect may comprise any of the features and/or functional steps of the examples described with respect to other aspects.

BRIEF DESCRIPTION OF THE DRAWINGS

Various examples will now be described with reference to the accompanying drawings in which.

DETAILED DESCRIPTION

Figures 1, 2, 3, 4:
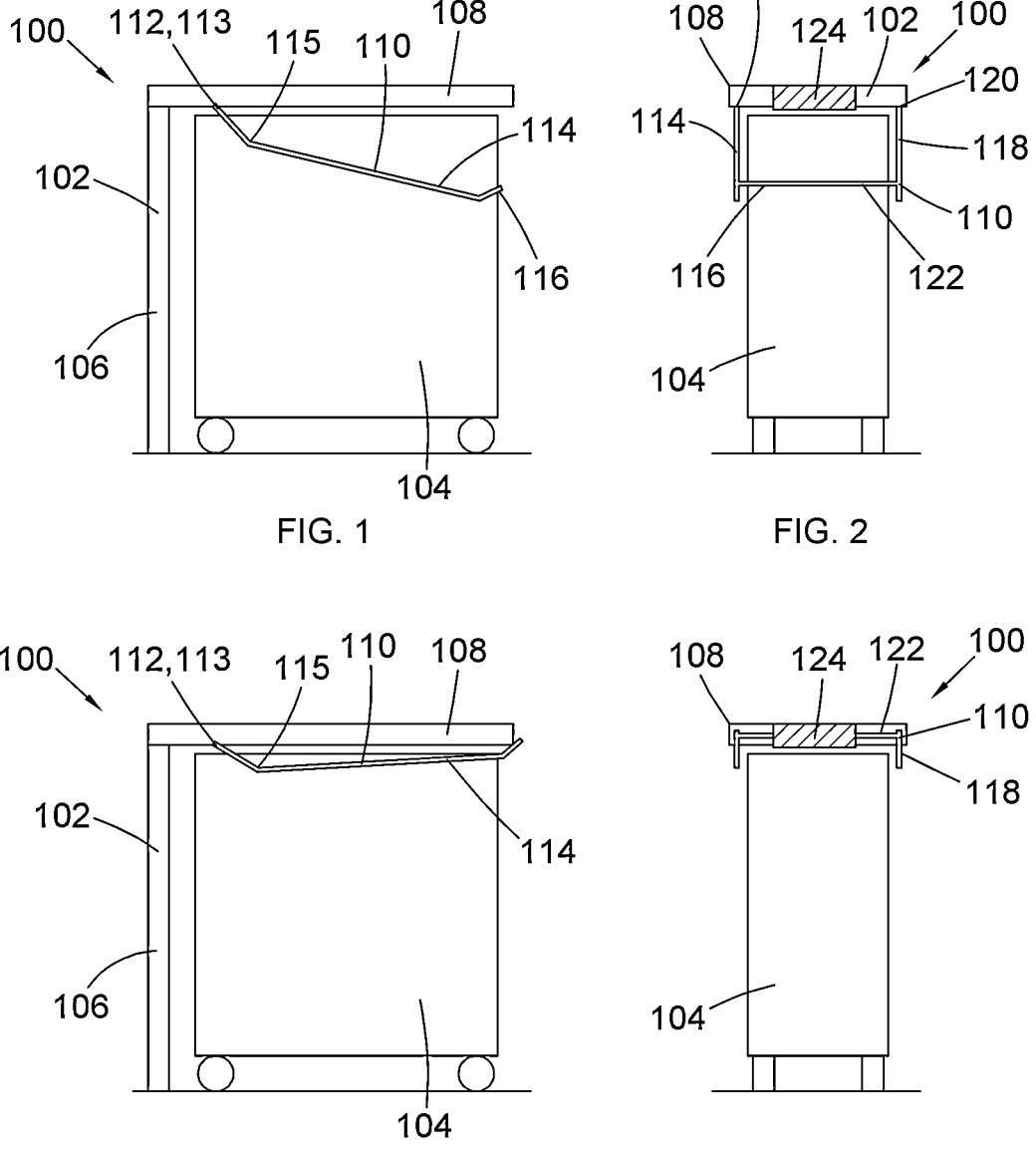
FIG. 1 shows a side view of an aircraft galley with a trolley retainer in a retaining position.
FIG. 2 shows a front view of the aircraft galley with the trolley retainer in the retaining position.
FIG. 3 shows a side view of the aircraft galley with the trolley retainer in an open position.
FIG. 4 shows a front view of the aircraft galley with the trolley retainer in the open position.
Figures 5, 6, 7, 8:
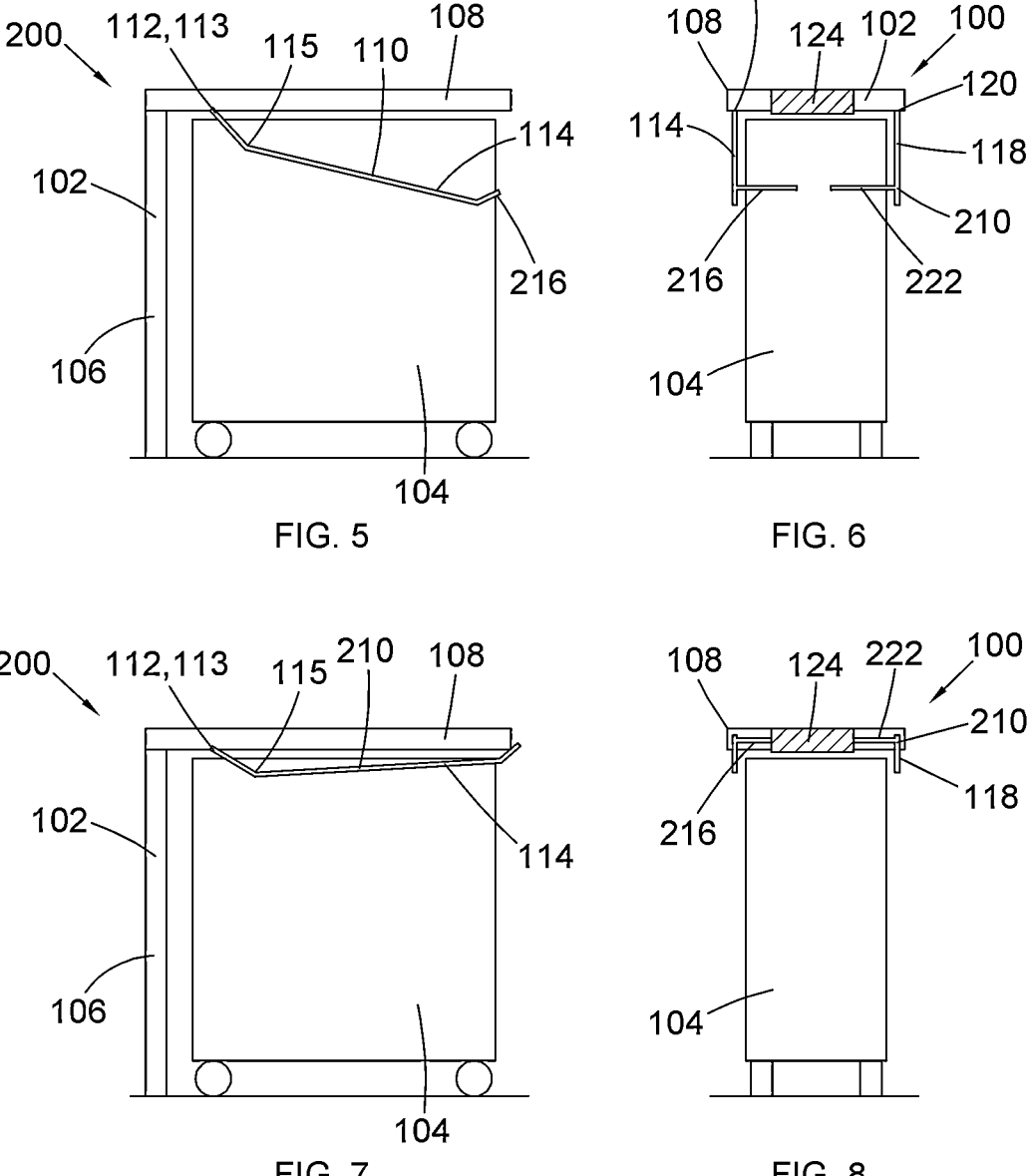
FIG. 5 shows a side view of a variant aircraft galley with a variant trolley retainer in a retaining position.
FIG. 6 shows a front view of the variant aircraft galley with the variant trolley retainer in the retaining position.
FIG. 7 shows a side view of the variant aircraft galley with the variant trolley retainer in an open position.
FIG. 8 shows a front view of the variant aircraft galley with the variant trolley retainer in the open position.

With reference to FIGS. 1 to 4, an aircraft galley 100 comprises a galley structure 102, and a trolley 104. The trolley 104 has a generally cuboidal shape and is supported by wheels to permit the trolley 104 to be moved around an aircraft.

The galley structure 102 comprises a support 106 and a cover 108. The support 106 extends upwardly (defined with respect to a longitudinal axis of the aircraft) and supports the cover 108. The cover 108 extends laterally, parallel to the longitudinal axis of the aircraft. The support 106 is positioned at a rear of the aircraft galley and extends across the rear of the aircraft galley. The aircraft galley 100 comprises an opening at a front of the aircraft galley 100.

In use, the trolley 104 may be inserted into the aircraft galley 100 through the opening and towards the support 106 at the rear of the aircraft galley 100. When the trolley 104 is received by the aircraft galley 100, the trolley 104 is fully positioned beneath the cover 108. The cover 108 extends over an entirety of the aircraft galley's footprint. The trolley 104 shown in FIGS. 1 to 4 extends from the front to the rear of the aircraft galley 100.

It will be appreciated that while only a single trolley 104 is shown in FIGS. 1 to 4, the aircraft galley 100 may be sized to accommodate a plurality of trolleys 104. Such trolleys 104 may be accommodated laterally adjacent to each other in a side by side configuration. Alternatively, the trolleys may be shorter than a depth of the aircraft galley (measured from the rear to the front of the aircraft galley), and may be accommodated in an end to end configuration.

The galley structure 102 comprises a trolley retainer 110. The trolley retainer 110 comprises a retainer connector 112. The retainer connector 112 connects the trolley retainer 110 to a galley connector 113 of the aircraft galley structure 102. The retainer connector 112 and the galley connector 113 rotatably connect the trolley retainer 110 to the aircraft galley structure 103. In some examples, the retainer connector 102 comprises an insertable portion (e.g. a rod) and the galley connector 113 comprises an aperture, with the insertable portion being inserted and rotatably retained in the aperture. The galley connector 103 is displaced from the opening towards the rear of the aircraft galley 100.

The trolley retainer 110 comprises a front portion 116. The front portion 116 extends across a front of the trolley 104 when the trolley retainer is in a retaining position, as shown in FIGS. 1 and 2. The front portion 116 extends across the front of the trolley 104 in a lateral direction. The front portion 116 extends across the front of the trolley 104 in a horizontal direction (relative to the aircraft). The front of the trolley 104 abuts the front portion 116. The front portion 116 thereby retains the trolley 104 in the aircraft galley 100 when the trolley retainer 102 is in the retaining position.

The trolley retainer 110 comprises a side portion 114. The side portion 114 extends from the retainer connector 112 to the front portion 116. The side portion 114 extends across a side of the trolley 104 when the trolley connector 110 is in the retaining position. The side portion 114 extends away from the rear of the aircraft galley 100. The side portion 114 extends towards the front of the aircraft galley 100. The side portion 114 extends in a direction normal to the direction in which the front portion 116 extends.

The side portion 114 is integrally formed with the retainer connector 112. The side portion 114 is integrally formed with the front portion 116. The trolley retainer 110 is formed from a bar. The trolley retainer 110 is substantially rigid. The trolley retainer 110 substantially maintains its shape in use.

The side portion 114 is concave when viewed from above. The side portion 114 comprises a bend 115. When the trolley connector 110 is in the retaining position, a gradient of the side portion 114 reduces from the rear to the front of the aircraft galley 100. The gradient of the side portion 114 reduces at the bend 115. This means that when the trolley retainer 110 is in the open position (as shown in FIGS. 3 and 4), a portion of the side portion 114 still extends across the side of the trolley 104, which may help to guide the trolley 104 into and out of the aircraft galley 100.

The trolley retainer 110 comprises an additional retainer connector 120, which is configured to connect to an additional galley connector 121 of the aircraft galley structure 102. The additional retainer connector 120 and the additional galley connector 121 have the same features as the retainer connector 112, but is positioned on an opposite side of the aircraft galley 10 to the retainer connector 112. The additional retainer connector 120 is the same as the retainer connector 112 but mirrored about a centreline of the trolley 104.

The trolley retainer 110 comprises an additional side portion 118. The additional side portion 118 has the same features as the side portion 114, but is positioned on an opposite side of the first aircraft galley 10 to the side portion 114. The additional side portion 118 is the same as the side portion 114 but mirrored about a centreline of the trolley 104.

The trolley retainer 110 comprises an additional front portion 122. The additional front portion 122 has the same features as the front portion 116. The additional front portion 122 is the same as the front portion 122 but mirrored about a centreline of the trolley 104. In the example of FIGS. 1 to 4, the front portion 116 connects to the additional front portion 122. The front portion 116 and the additional front portion 122 extend fully across the front of the trolley 114. The front portion 116 and the additional front portion 122 is integrally formed with the front portion.

The trolley retainer 110 is substantially symmetrical about a centreline of the trolley 104.

In some examples, the additional retainer connector 120, the additional side portion 118 and the additional front portion 122 may be omitted. In such examples, the front portion may extend partially or fully across the front of the trolley 104.

The aircraft galley structure 102 comprises a maintaining device 124. The maintaining device 124 maintains the retainer 110 in the open position, as shown in FIGS. 3 & 4. The maintaining device 124 may comprise a latch, which may maintain the retainer 110 in the open position by contacting the front portion 116 or additional front portion 122. The latch may be opened to permit the retainer 110 to move away from the open position, as described below.

In use, when the trolley retainer 110 is in the retaining position, as shown in FIGS. 1 and 2, the front portion 116 extends across the front of the trolley 104 to retain the trolley 104 in the aircraft galley 100 as described above. Additionally, the additional front portion 122 extends across the front of the trolley 104 to retain the trolley 104 in the aircraft galley 100 as described above. The trolley retainer 110 is maintained in the retaining position by the weight of the trolley retainer 110.

To remove the trolley 104 from the aircraft galley 100, the trolley retainer 104 is moved into the open position, which is shown in FIGS. 3 and 4. To move the trolley retainer 104 into the open position, the trolley retainer 110 is rotated at the retainer connector 112. The trolley retainer 110 is also rotated at the additional retainer connector 120, which in the present example shares a rotation axis with the retainer connector 112. The trolley retainer 110 moves upwardly from the retaining position to the open position.

When the trolley retainer 110 is in the open position, the front portion 116 (and the additional front portion 122) does not extend across the front of the trolley 104. More specifically, the front portion 116 (and the additional front portion 122) is above the trolley 104. When the trolley retainer 110 is in the open position there is a clear path to move the trolley 104 into or out of the aircraft galley 100.

To maintain the trolley retainer 110 in the open position the maintaining device 124 is used. In the present example, the latch of the maintaining device 124 is closed. The trolley 104 is then removed from the aircraft galley 100 by pulling the trolley out through the opening.

When the trolley 104 is returned to the aircraft galley 100, the trolley 104 is inserted into the aircraft galley 100 through the opening such that the trolley 104 abuts the rear of the aircraft galley 100. The maintaining device 124 is opened (by opening the latch), which permits the trolley retainer 110 to return to the retaining position. The trolley retainer 110 returns to the retaining position under its own weight.

With reference to FIGS. 5 to 8 a variant aircraft galley 200 comprises a variant trolley retainer 210. The variant aircraft galley 200 comprises many of the features of the aircraft galley 100, and repeated description of those features is omitted. The same reference numerals are used for features of the variant aircraft galley 200 which are the same as those of the aircraft galley 100.

The variant trolley retainer 210 comprises a variant front portion 216 and a variant additional front portion 222. The variant front portion 216 and the variant additional front portion 222 do not connect to each other, with a gap forming between them. In the present example, the variant front portion 216 and the variant additional front portion 222 are laterally displaced from each other. In other examples, the variant front portion and the variant additional front portion may be vertically displaced (defined with respect to the aircraft) from each other.

The variant front portion 216 and the variant additional front portion 222 may be independently movable to their open positions (shown in FIGS. 7 and 8), with independent rotation possible at the retainer connector 112 and the additional retainer connector 120.

Various aspects of the apparatus and methods disclosed in the various embodiments may be used alone, in combination, or in a variety of arrangements not specifically discussed in the embodiments described in the foregoing, and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A trolley retainer for an aircraft galley, the aircraft galley comprising an aircraft galley structure and a trolley, the trolley retainer comprising:

a retainer connector configured to connect the trolley retainer to the aircraft galley structure;

a front portion configured to extend across a front of the trolley to retain the trolley in the aircraft galley when the trolley retainer is in a retaining position; and a side portion configured to extend from the retainer connector to the front portion across a side of the trolley when the trolley retainer is in the retaining position, wherein the trolley retainer is movable into an open position to permit removal of the trolley from the aircraft galley, and wherein a portion of the side portion extends across the side of the trolley when the trolley retainer is in the open position.

2. The trolley retainer according to claim 1, wherein the trolley retainer is rotatable at the retainer connector between the retaining position and the open position.

3. The trolley retainer according to claim 1, wherein the trolley retainer comprises:

an additional retainer connector configured to connect the trolley retainer to the aircraft galley structure;

an additional front portion configured to extend across a front of the trolley to retain the trolley in the aircraft galley when the trolley retainer is in a retaining position; and an additional side portion configured to extend from the additional retainer connector to the additional front portion, the additional side portion configured to extend across an opposing side of the trolley when the trolley retainer is in the retaining position, wherein the opposing side opposes the side of the trolley.

4. The trolley retainer according to claim 3, wherein the additional front portion connects to the front portion.

5. The trolley retainer according to claim 4, wherein the additional front portion is integrally formed with the front portion.

6. The trolley retainer according to claim 3, wherein the additional front portion does not connect to the front portion.

7. The trolley retainer according to claim 6, wherein the additional front portion and the front portion are configured such that there is lateral displacement between the additional front portion and the front portion in the retaining position.

8. The trolley retainer according to claim 1, wherein the trolley retainer is configured such that in the retaining position the trolley retainer is lower than in the open position.

9. A galley structure comprising the trolley retainer of claim 1, the galley structure comprising a galley connector, the galley connector configured to connect to the retainer connector.

10. The galley structure according to claim 9, further comprising:

an opening for inserting the trolley into the galley, wherein the galley connector is displaced from the opening.

11. The galley structure according to claim 9 further comprising a maintaining device, the maintaining device configured to maintain the retainer in the closed open position.

12. An aircraft comprising the galley structure of claim 9.

\*   \*   \*   \*   \*